(12) United States Patent
Alive et al.

(10) Patent No.: US 9,283,547 B2
(45) Date of Patent: Mar. 15, 2016

(54) CATALYTIC ARTICLE WITH SEGREGATED WASHCOAT AND METHODS OF MAKING SAME

(71) Applicant: BASF Corporation, Florham Park, NJ (US)

(72) Inventors: Keshavaraja Alive, Macungie, PA (US); Xinsheng Liu, Edison, NJ (US); Ye Liu, Holmdel, NJ (US); Michael P. Galligan, Cranford, NJ (US); Pascaline Harrison Tran, Holmdel, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/208,018

(22) Filed: Mar. 13, 2014

(65) Prior Publication Data

US 2014/0274676 A1    Sep. 18, 2014

Related U.S. Application Data

(60) Provisional application No. 61/783,031, filed on Mar. 14, 2013.

(51) Int. Cl.
*B01J 23/00* (2006.01)
*B01J 23/02* (2006.01)
(Continued)

(52) U.S. Cl.
CPC .............. *B01J 23/63* (2013.01); *B01D 53/945* (2013.01); *B01J 35/0006* (2013.01);
(Continued)

(58) Field of Classification Search
CPC ............ B01J 23/10; B01J 23/42; B01J 23/44; B01J 23/464; B01J 23/56; B01J 23/63; B01J 21/04; B01J 21/066

USPC ......... 502/304, 326, 332–334, 339, 349, 355, 502/439, 527.12

See application file for complete search history.

(56) References Cited

U.S. PATENT DOCUMENTS 3,854,982 A * 12/1974 Aelion .................... C03C 17/32
                                                                427/498
4,153,579 A    5/1979 Summers et al.
(Continued)

FOREIGN PATENT DOCUMENTS

DE       102011010104      8/2011
JP          55132639       10/1980
(Continued)

OTHER PUBLICATIONS

Disperal/Dispal High purity dispersible aluminas, *Sasol*, 10 pages.
(Continued)

*Primary Examiner* — Cam N. Nguyen
(74) *Attorney, Agent, or Firm* — Womble Carlyle Sandridge & Rice, LLP (57) ABSTRACT

Provided herein are catalytic articles and methods of making same using a single coat process. The catalytic article comprises an elongated substrate monolith having a plurality of longitudinally extending passages, each passage having at least a first surface and a second surface opposite the first surface, the first and second surfaces coated with at least a first coating and a second coating, wherein the first coating comprises a first catalyst composition and overlies the second coating on the first surface, the second coating comprises a second catalyst composition and overlies the first coating on the second surface, and wherein the first catalyst composition and second catalyst composition have a difference in surface charge. The washcoat may be applied as one slurry, which then self-segregates into two coatings.

10 Claims, 3 Drawing Sheets

(51) Int. Cl.

| | | |
|---|---|---|
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 21/04* | (2006.01) | |
| *B01J 23/63* | (2006.01) | |
| *B01J 37/02* | (2006.01) | |
| *B01J 35/00* | (2006.01) | |
| *B01J 35/04* | (2006.01) | |
| *B01D 53/94* | (2006.01) | |

(52) U.S. Cl.
CPC ............ *B01J 35/0033* (2013.01); *B01J 35/04* (2013.01); *B01J 37/0244* (2013.01); *B01D 2255/1021* (2013.01); *B01D 2255/1023* (2013.01); *B01D 2255/1025* (2013.01); *B01D 2255/2065* (2013.01); *B01D 2255/20715* (2013.01); *B01D 2255/9022* (2013.01); *B01D 2258/014* (2013.01); *B01J 37/0203* (2013.01); *B01J 37/0248* (2013.01); *B01J 2523/00* (2013.01); *Y10T 428/24149* (2013.01)

(56) References Cited

U.S. PATENT DOCUMENTS

| | | | |
|---|---|---|---|
| 5,202,299 A | 4/1993 | Symons et al. | |
| 5,272,125 A | 12/1993 | Weible et al. | |
| 5,597,771 A * | 1/1997 | Hu et al. | ........................ 502/304 |
| 5,753,581 A | 5/1998 | Beckmeyer et al. | |
| 5,948,377 A * | 9/1999 | Sung | .......................... 423/213.5 |
| 5,948,723 A * | 9/1999 | Sung | .......................... 502/303 |
| 5,981,427 A | 11/1999 | Sung et al. | |
| 5,990,038 A | 11/1999 | Suga et al. | |
| 6,022,825 A | 2/2000 | Andersen et al. | |
| 6,294,140 B1 * | 9/2001 | Mussmann et al. | ........ 423/213.5 |
| 6,524,992 B2 | 2/2003 | Mussmann et al. | |
| 6,625,976 B1 | 9/2003 | Andersen et al. | |
| 7,276,212 B2 * | 10/2007 | Hu et al. | ........................ 422/177 |
| 7,749,621 B2 * | 7/2010 | Greenberg | .............. C23C 16/40 428/426 |
| 7,811,962 B2 * | 10/2010 | Hu et al. | ........................ 502/304 |
| 8,007,750 B2 * | 8/2011 | Chen et al. | ................ 423/239.1 |
| 8,012,610 B2 * | 9/2011 | Greenberg | .............. C23C 16/40 428/336 |
| 8,449,852 B1 * | 5/2013 | Sung et al. | ................. 423/213.5 |
| 8,524,182 B2 * | 9/2013 | Grubert et al. | ............. 423/213.2 |
| 8,530,372 B2 * | 9/2013 | Luo et al. | ...................... 502/303 |
| 8,568,674 B1 * | 10/2013 | Sung et al. | ................. 423/213.2 |
| 8,568,675 B2 * | 10/2013 | Deeba et al. | ............... 423/213.5 |
| 8,668,877 B2 * | 3/2014 | Wei et al. | ....................... 422/177 |
| 8,845,974 B2 * | 9/2014 | Li et al. | .......................... 422/177 |
| 2004/0198595 A1 * | 10/2004 | Chen | ........................... 502/328 |
| 2005/0232829 A1 * | 10/2005 | Fuls | ..................... F01N 3/0222 422/180 |
| 2010/0056367 A1 | 3/2010 | Imai | |
| 2010/0126154 A1 | 5/2010 | Klingmann et al. | |
| 2010/0183490 A1 * | 7/2010 | Hoke et al. | ................. 423/213.5 |
| 2010/0310441 A1 | 12/2010 | Lapadula et al. | |
| 2011/0165046 A1 | 7/2011 | Drews et al. | |
| 2011/0177939 A1 | 7/2011 | Nakamura et al. | |
| 2011/0271664 A1 * | 11/2011 | Boorse et al. | ..................... 60/301 |
| 2011/0274603 A1 | 11/2011 | Kohara et al. | |
| 2013/0084222 A1 * | 4/2013 | Grubert et al. | ................ 422/170 |
| 2013/0142714 A1 * | 6/2013 | Sung et al. | ................. 423/213.5 |
| 2014/0161695 A1 * | 6/2014 | Hilgendorff et al. | ...... 423/213.5 |
| 2014/0205523 A1 * | 7/2014 | Arnold et al. | .............. 423/213.5 |

FOREIGN PATENT DOCUMENTS

| | | |
|---|---|---|
| JP | 2004174366 | 6/2004 |
| JP | 2004209323 A | 7/2004 |
| WO | WO-0013772 | 3/2000 |

OTHER PUBLICATIONS

English abstract of JP 2004-209323—Jul. 29, 2004.
International Search Report Dated Jul. 29, 2014.

* cited by examiner

CATALYTIC ARTICLE WITH SEGREGATED WASHCOAT AND METHODS OF MAKING SAME

CROSS-REFERENCE TO RELATED APPLICATIONS

This application claims priority to U.S. Provisional Application No. 61/783,031, filed Mar. 14, 2013, the entire contents of which are herein incorporated by reference.

TECHNICAL FIELD

This invention pertains generally to catalysts for the treatment of exhaust gases. More specifically, this invention is directed to catalytic articles having a segregated washcoat.

BACKGROUND

The exhaust gases of internal combustion engines contain pollutants such as hydrocarbons, carbon monoxide and nitrogen oxides ($NO_x$) that foul the air. Emission standards for unburned hydrocarbons, carbon monoxide and nitrogen oxide contaminants have been set by various governments and must be met by older as well as new vehicles. In order to meet such standards, catalytic converters containing a three way catalyst (TWC) may be located in the exhaust gas line of internal combustion engines. The use of exhaust gas catalysts have contributed to a significant improvement in air quality. The TWC is the most commonly used catalyst and it provides the three functions of oxidation of CO, oxidation of unburned hydrocarbons (HC's) and reduction of NOx to $N_2$. TWCs typically utilize one or more platinum group metals (PGM) to simultaneously oxidize CO and HC and reduce NOx compounds. The most common catalytic components of a TWC are platinum (Pt), rhodium (Rh) and palladium (Pd).

The platinum group metals (PGM) in the TWC catalysts (e.g., platinum, palladium, rhodium, ruthenium and iridium) are typically dispersed on a high surface area, refractory metal oxide support, e.g., a high surface area alumina coating, or on an oxygen storage component (OSC), or their mixtures. The support is carried on a suitable substrate such as a monolithic substrate comprising a refractory ceramic or metal honeycomb structure, or refractory particles such as spheres or short, extruded segments of a suitable refractory material. The TWC catalyst substrate may also be a wire mesh, typically a metal wire mesh, which is particularly useful in small engines.

Many TWC catalysts are manufactured with at least two separate catalyst coating compositions (washcoats) that are applied in the form of aqueous dispersions as successive layers on a substrate (for example, a honeycomb body composed of ceramic or metal) in order to separate noble metals, such as, palladium and rhodium which represent the main catalytically active species. Separation has been necessary historically because some platinum group metals, such as palladium and rhodium, can form an alloy which is known to be less catalytically active.

There is a need to provide single washcoat compositions containing precious metals (i.e., palladium and rhodium) while maintaining and/or improving catalytic performance as compared to compositions that provide these metals individually for separate layers. There is also a need for applying the single washcoat composition in one coating step. There is also continuing need to provide a TWC catalyst composites that utilize precious metals efficiently and remain effective to meet regulated HC, NOx, and CO conversions.

SUMMARY

A first aspect of the invention pertains to a catalytic article comprising an elongated substrate monolith having a plurality of longitudinally extending passages, each passage having at least a first surface and a second surface opposite the first surface, the first and second surfaces coated with at least a first coating and a second coating, wherein the first coating comprises a first catalyst composition and overlies the second coating on the first surface, the second coating comprises a second catalyst composition and overlies the first coating on the second surface, and wherein the first catalyst composition and second catalyst composition have a difference in surface charge. In one or more embodiments, the difference in surface charge is equal to or greater than about 10 Coulombs/$m^2$.

In one or more embodiments, the first composition comprises a first platinum group metal. In some embodiments, the first platinum group metal is thermally or chemically fixed to a first support material. In one or more embodiments, the first platinum group metal comprises palladium and/or platinum. In some embodiments, the palladium is present in an amount of about 0.05-10% by weight of the total catalyst. In one or more embodiments, the second composition comprises a second platinum group metal thermally or chemically fixed to a second support material. In some embodiments, the second platinum group metal is thermally or chemically fixed to a second support material. In one or more embodiments, the second platinum group metal comprises rhodium. In some embodiments, the rhodium is present in an amount of about 0.005-5% by weight of the total catalyst.

In one or more embodiments, the second support comprises ceria. In some embodiments, the first platinum group metal comprises palladium and the second platinum group metal comprises rhodium, and the palladium and rhodium are present in a ratio of about 1:10 to about 100:1. In one or more embodiments, the palladium and rhodium are present in an amount of about 5 to about 300 grams per cubic feet. In some embodiments, the first support comprises alumina, and the second support comprises ceria. In one or more embodiments, the first support comprises zirconia, and the second support comprises ceria. In some embodiments, the zirconia is doped with ceria.

Another aspect of the invention relates to a method of making a catalyst article. The method comprises providing a first support having a first surface charge and a first platinum group metal thermally or chemically fixed to the first support particle; providing a second support having a second surface charge less than the first surface charge and a second platinum group metal thermally or chemically fixed to the second support particle; suspending the first and second supports in a single slurry comprising a liquid medium and the first and second supports; applying the single washcoat to a substrate.

In one or more embodiments, the single washcoat provides two compositionally distinct coatings, a first coating and a second coating. In some embodiments, the substrate comprises an elongated substrate monolith having a plurality of longitudinally extending passages, each passage having at least a first surface and a second surface opposite the first surface, and wherein the first coating overlies the second coating on the first surface, and the second coating overlies the first coating on the second surface. In one or more embodiments, the difference in surface charge is equal to or greater than about 10 Coulombs/$m^2$. In some embodiments, the first support comprises ceria and the second support comprises zirconia. In one or more embodiments, the first support comprises high density ceria and the second support comprises low density zirconia doped with Pr.

In some embodiments, thermally fixing the platinum group metal to the first support and second support comprises impregnating the platinum group metal onto the first and second support to provide an impregnated support and calcining impregnated support. In one or more embodiments, the impregnated supports are calcined for at least about 0.25 to about 4 hours at a temperature ranging from about 100 to about 800° C. In some embodiments, wherein the pH of the slurry is maintained in the range of about 3 to about 9. In one or more embodiments, wherein the slurry pH is controlled by adding an organic acid. In some embodiments, wherein the organic acid comprises tartaric acid, formic acid or nitric acid.

In one or more embodiments, wherein the platinum group metal thermally or chemically fixed to the first support particle comprises Rh in an amount of about 0.5-10% by weight of the total catalyst. In some embodiments, wherein the platinum group metal thermally fixed to the second support particle comprises Pd or Pt in an amount of about 0.05-5% by weight of the total catalyst.

In one or more embodiments, wherein the first support comprises alumina, and the second support comprises ceria. In some embodiments, wherein the first support comprises zirconia, and the second support comprises ceria. In one or more embodiments, wherein the zirconia is doped with ceria.

DETAILED DESCRIPTION

Provided are catalytic articles and methods of producing the same. The catalytic articles are advantageously made from a single washcoat process, whereby the washcoat segregates into two or more coatings based on the surface charge of the catalytic particles contained therein. In some embodiments, the catalytic articles produced by these processes feature an ordering of the coatings which have the opposite ordering on the opposite of a given channel in a substrate. That is, where one coat overlies a second, the second will overlie the first on the opposing wall. In other embodiments, the catalytic articles produced by these processes are conventional; that is, the same layer is always closer to the substrate.

Catalytic Article

Accordingly, one aspect of the invention relates to a catalytic article comprising an elongated substrate monolith having a plurality of longitudinally extending passages, each passage having at least a first surface and a second surface opposite the first surface, the first and second surfaces coated with at least a first coating and a second coating, wherein the first coating comprises a first catalyst composition and overlies the second coating on the first surface, the second coating comprises a second catalyst composition and overlies the first coating on the second surface, and wherein the first catalyst composition and second catalyst composition have a difference in surface charge.

Figure 1A:
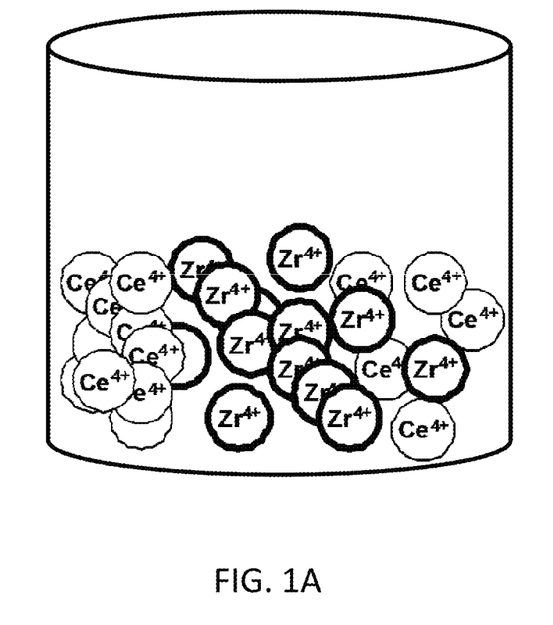
FIGS. 1A and B are representations of two supports in a slurry before and after coating a substrate in accordance with one or more embodiments of the invention.
Figure 1B:
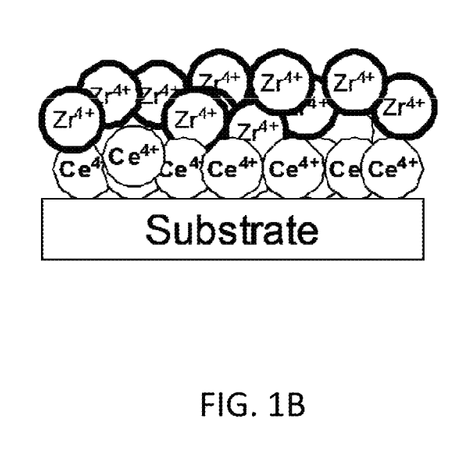

Segregation of the two first and second coating is achieved by creating or selecting materials with a difference in surface charge of the first and second catalyst compositions. Accordingly, in one or more embodiments, the difference in surface charge is equal to or greater than about 10 Coulombs/m$^2$, or greater than about 12 Coulombs/m$^2$. Surface charge can be measured using a Zeta potential probe analyzer. Therefore, surface charge modification can play a key role in achieving precious metal segregation in a single layer catalyst. For example, zirconia is less basic than ceria; thus, ceria would show relatively less affinity for anions compared to zirconia. So zirconia covered with nitrate ions tends to form a separate layer in a slurry and when applied as a washcoat. FIGS. 1A and B illustrate this concept. FIG. 1A shows a container with a slurry containing zirconia-based particles and ceria-based particles. FIG. 1B. shows the slurry after it was been washcoated onto a substrate. Once the slurry is coated onto the substrate, it will separate, resulting in discrete zirconia and ceria layers. In some embodiments, the surface can further be modified by modification of the surface using adsorption of species (e.g., organic ions and/or organic surfactants).

In one or more embodiments, the catalyst compositions comprise precious or platinum group metals. In some embodiments, the first composition comprises a first platinum group metal. In one or more embodiments, the second composition comprises a second platinum group metal thermally or chemically fixed to a second support material. In some embodiments, the first platinum group metal is thermally or chemically fixed to a first support material. In one or more embodiments, the first platinum group metal comprises palladium or platinum. In one or more embodiments, the palladium is present in an amount of about 0.2, 0.5, 1, 2, 3, 4, 5, 6, 7, 8, 9 or 10% by weight of the total catalyst. In some embodiments, the palladium is present in an amount of about 1-3% by weight of the total catalyst. In further embodiments, the palladium is present in an amount of about 1.4% by weight of the total catalyst. In one or more embodiments, the first support comprises zirconia.

In one or more embodiments, the second platinum group metal is thermally or chemically fixed to a second support material. In some embodiments, the second platinum group metal comprises rhodium. In one or more embodiments, the rhodium is present in an amount of about 0.2, 0.5, 1, 2, 3, 4, or 5% by weight of the total catalyst. In some embodiments, the rhodium is present in an amount of about 1-5, or 1-3% by weight of the total catalyst. In one or more embodiments, the rhodium is present in an amount of about 0.25% by weight of the total catalyst. In some embodiments, the second support comprises ceria. In one or more embodiments, the first platinum group metal comprises palladium and the second platinum group metal comprises rhodium, and the palladium and rhodium are present in a ratio of about 1:1 to about 50:1 or 5:1 to about 20:1 or about 10 to about 1. In some embodiments, the palladium and rhodium are present in an amount of about 5 to about 300, or about 10 to about 100 grams per cubic feet. If there is more than one platinum group metal on a given support, the platinum group metals may be in the form of alloy, particle assemblies, core shells, etc.

The layers are formed from a single washcoat layer that contains two or more precious metals, each of which is on its own support, resulting in a homogeneous mixture of the metals in the same layer on a substrate. One or more of the precious metals are fixed to their individual support, which means that the precious component is not soluble in the washcoat dispersion. Fixing of precious metals can occur by chemical or thermal fixation. For thermal fixing, to produce a "thermally-fixed" precious metal, it is meant that the impregnated supports are treated with heat such that the precious metals are converted to their oxide forms and that upon use of the thermally-fixed precious metals on supports in an aqueous slurry, the precious metals are not soluble and do not alloy/agglomerate. For chemical fixation, the pH or some other parameter of the dispersion of the precious metal salt with support is changed to render the precious metal component insoluble in the washcoat dispersion. The thickness of the washcoat will depend on the washcoat loading. In some embodiments, the thickness is from about 100 to about 200 microns. The porosity of a washcoat depends on the particle itself and between particles. The latter depends on the particle size of the support materials. Pore size for the particle itself is within about 10 to about 200 nanometers, and between particles is normally within about 100 nanometers to about 30 microns.

Reference to a "support" in a catalyst washcoat layer refers to a material that receives precious metals, stabilizers, promoters, binders, and the like through association, dispersion, impregnation, or other suitable methods. Useful high-surface area supports include one or more refractory oxides. These oxides include, for example, silica, alumina, titania, zirconia, and mixed oxide forms thereof such as silica-alumina, aluminosilicates (which may be amorphous or crystalline), alumina-zirconia, alumina-ceria, titanium-alumina, and zirconium-silicate. In one embodiment, the support is comprised of alumina. Alumina includes the members of the gamma, delta, theta or transitional aluminas, such as gamma and beta aluminas, and, if present, a minor amount of other refractory oxide, e.g., about up to 20 weight percent. High surface area refractory metal oxide supports refer to support particles having high external surface area, pores larger than 20 Å, and a wide pore distribution. High surface area refractory metal oxide supports, e.g., "gamma alumina" or "activated alumina," used with oxidation catalysts typically exhibit a BET surface area in excess of 60 square meters per gram ("$m^2/g$"), often up to about 200 $m^2/g$ or higher. "BET surface area" refers to the Brunauer, Emmett, Teller method for determining surface area by $N_2$ adsorption. As used herein, the term "activated alumina" refers to a high surface area phase of alumina, such as, but not limited to, gamma-alumina. Such activated alumina is usually a mixture of the gamma and delta phases of alumina, but may also contain substantial amounts of eta, kappa, and theta alumina phases. Refractory metal oxides other than activated alumina may be utilized as a carrier for at least some of the catalytic components in a given catalyst. For example, bulk ceria, zirconia, alpha-alumina and other materials are known for such use. Although many of these materials have a lower BET surface area than activated alumina, that disadvantage tends to be offset by the greater durability of the resulting catalyst or a beneficial interaction with precious metal deposited on the support. Examples of supports include, but are not limited to, high surface area refractory metal oxides and composites containing oxygen storage components. Exemplary support materials are high surface area aluminum oxide (>80, 90, 100, 125, or even 150 $m^2/g$) (in various modifications), zirconium oxide components that can be combined with stabilizers such as lanthana (i.e., Zr—La composites), and oxygen storage components (i.e. cerium-zirconium mixed oxides in various embodiments). Exemplary high surface area refractory metal oxides can comprise an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Other suitable supports may include silica, titania zeolites, etc.

In one or more embodiments, the first support comprises alumina and the second support comprises ceria. In other embodiments, the first support comprises zirconia and the second support comprises ceria. Supports may also be promoted with other elements. For example, a support may comprise Pr-promoted zirconia, or Ba/La-promoted zlumina.

In one or more embodiments, one or more catalyst compositions are disposed on a "substrate." The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a substrate is utilized, the resulting system will be able to remove particulate matters along with gaseous pollutants. The wall-flow filter substrate can be made from materials commonly known in the art, such as cordierite or silicon carbide.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

In alternative embodiments, one or more catalyst compositions may be deposited on an open cell foam substrate. Such substrates are well known in the art, and are typically formed of refractory ceramic or metallic materials.

In some embodiments, the catalytic article further comprises a third coating, wherein the third coating comprises a third catalyst composition. The third catalyst composition would have also have a difference in surface charge from the first and second to product a third coating. The ordering of the coatings is opposite relative to the surface. That is, if the first coating overlays the second coating, which overlies the third coating on the first surface, the third coating will overlay the second coating, which will overlay the first coating on the second surface. In some embodiments, additional layers may be added.

Method of Forming Catalytic Article

There is a substantial challenge of combining two individual platinum group metals in one coating composition due to the solubility of precious metal salts in water. In conventional TWC catalysts, for example, the platinum group metals palladium and rhodium are individually applied by impregnation to the support materials and are then subsequently incorporated into an aqueous washcoat dispersion. Specifically, prior art methods included:

a. Application of a first noble metal by impregnation with a metal salt solution without regard to dilution to a first support (aluminum oxide or OSC) to form a first impregnated support;

b. Production of a first aqueous washcoat dispersion using the first impregnated support;

c. Application of a second noble metal by impregnation with a metal salt solution without regard to dilution to a second support (aluminum oxide or OSC) to form a second impregnated support;

d. Production of a second aqueous washcoat dispersion using the second impregnated support;

e. Application of a first layer onto substrate using the first aqueous washcoat dispersion and calcination of the first layer;

f. Application of a second layer onto substrate using the second aqueous washcoat dispersion and calcinations of the second layer.

As discussed above, generally, if both noble metals are processed in a single aqueous washcoat dispersion utilizing conventional methods, the probability of the two noble metals forming an alloy within the washcoat layer as a result of the use of water-soluble metal salts would be greatly increased. This would lead to the performance of the TWC catalyst being poorer in this case than in the case of separate palladium and rhodium layers.

Accordingly, one aspect of the invention relates to a method of making a catalyst article. The method allows for a single washcoat to be applied to a substrate, but the platinum group metals are kept separate, thereby preventing alloying. Accordingly, the method comprises providing a first support having a first surface charge and a first platinum group metal thermally or chemically fixed to the first support particle; providing a second support having a second surface charge less than the first surface charge and a second platinum group metal thermally or chemically fixed to the second support particle; suspending the first and second supports in a single slurry comprising a liquid medium and the first and second supports; and applying the single washcoat to a substrate. In one or more embodiments, the single washcoat provides two compositionally distinct coatings, a first coating and a second coating. In one or more embodiments, other chemical aspects of the supports and/or slurry may aid in layer segregation. For example, the supports may have different densities, which help to form multi layers within the slurry.

In some embodiments, the substrate comprises an elongated substrate monolith having a plurality of longitudinally extending passages, each passage having at least a first surface and a second surface opposite the first surface, and wherein the first coating overlies the second coating on the first surface, and the second coating overlies the first coating on the second surface. In one or more embodiments, the difference in surface charge is equal to or greater than about 10 Coulombs/m$^2$.

A first support having a first surface charge and a first platinum group metal thermally fixed to the first support particle must first be provided. Any of the variants described above with respect to the finished catalytic article may be applied here. For example, rhodium may be supported onto a ceria and thermally fixed. Palladium may be supported on a Pr-doped zirconia and thermally fixed.

As discussed above, in some embodiments, the precious metal may be thermally fixed to support. In one or more embodiments, thermally fixing a precious metal onto a support may include impregnating the precious metal onto a powder and then calcining the impregnated support. Calcination affixes the metal onto the support. Methods known in the art may be employed. A general temperature range for calcination is about 100 to about 800° C., or more specifically about 300 to about 600° C. However, the specific temperature may depend on the specific salts used. For example, where sulfates are used, higher temperatures (e.g., about 750° C.) may be utilized. Amine acetates will generally necessitate lower temperatures, less than about 400° C. Duration of the calcination can vary anywhere from about 0.25 to about 4 hours, or about 0.5 hours to about 4 hours. Any combination of time and temperature may be utilized, as fits for the specific conditions. Exemplary calcination conditions are at 550° C. for two hours.

In some embodiments, the precious metal may be chemically fixed onto the support using methods known in the art. For example, palladium may be fixed with BaOH and Rh may be fixed with mono-ethanolamine (MEA).

Once the platinum group metals have been affixed to the support, a washcoat can be prepared with the supports. The first and second supports may be suspended in a single slurry comprising a liquid medium and the first and second supports.

Generally, any method that modifies the surface charge may be used to obtain the necessary charge differential. For example, modifications of the surface may be carried out using adsorption of species such as inorganic ions or organic surfactants, as well as thermal treatment. In some embodiments, the pH of the slurry can be controlled by using one or more acids. In some embodiments, the acid comprises an organic acid. In further embodiments, the acid comprises tartaric acid, formic acid or nitric acid. While not wishing to be bound to any particular theory, it is thought that the slurry can be visualized precious metal oxide particles dispersed in aqueous medium with a minimum amount of ions (e.g., tartarates and H+). In some embodiments, the pH of the slurry is maintained at about 3 to about 9, or 5.5 to about 6 The resulting slurry will separate into two visible layers when left undisturbed.

In embodiments where the precious metal is chemically fixed to the support, the slurry can be visualized as precious metal hydroxide particles dispersed well in aqueous medium with lots of negatively and positively charged ions (e.g., nitrates, acetates, tartarates, H+, Ba++, etc).

Once the slurry has been prepared, it may be applied to a substrate using methods known in the art. As described above, only one washcoat need be applied to achieve more than one layer. This is advantageous, as less process steps are required for production of the catalytic article, increasing throughput and saving cost.

TWC catalysts that exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable substrate such as a monolithic substrate comprising a refractory ceramic or metal honeycomb structure, or refractory particles such as spheres or short, extruded segments of a suitable refractory material. The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith). TWC catalysts can be formulated to include an oxygen storage component (OSC) including, for example, ceria and praseodymia.

High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption.

The catalytic layer may also contain stabilizers and promoters, as desired. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium. Suitable promoters include one or more non-reducible oxides of one or more rare earth metals selected from the group consisting of lanthanum, praseodymium, yttrium, zirconium and mixtures thereof.

It should be noted that in some embodiments, the above processes will result in a conventional coating pattern. That is, a layer will always be the layer closer to the substrate, and the other layer will always be the layer above the first layer.

Another aspect of the invention pertains to having a substrate with a charge, and having a higher affinity for a first support particle compared to a second support particle. This would allow for either of the first or second supports to always be drawn closer to the substrate, resulting in the slurry segregating such that one washcoat layer will always overlay the other. Any of the PGM, supports, etc. from the above process may be applied in this process.

Method of Treating Exhaust

The catalytic articles described herein may be used to treat internal combustion exhaust. In one or more embodiments, the method comprises contacting the exhaust gas stream of an internal combustion engine (for example a stoichiometric gasoline engine) with a catalytic article comprising an elongated substrate monolith having a plurality of longitudinally extending passages, each passage having at least a first surface and a second surface opposite the first surface, the first and second surfaces coated with at least a first coating and a second coating, wherein the first coating comprises a first catalyst composition and overlies the second coating on the first surface, the second coating comprises a second catalyst composition and overlies the first coating on the second surface, and wherein the first catalyst composition and second catalyst composition have a difference in surface charge. Any of the variations described above may be applied to this method.

EXAMPLES

The following non-limiting examples shall serve to illustrate the various embodiments of the present invention.

Example 1

Figure 2A:
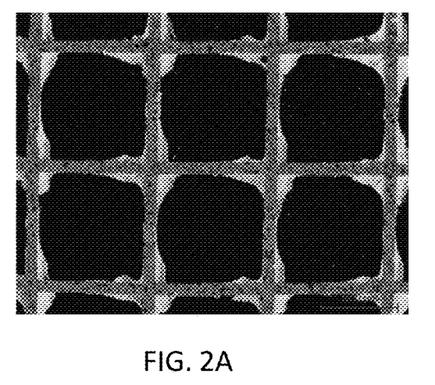
FIGS. 2A-D are transmission electron microscope images of a catalytic article in accordance with one or more embodiments of the invention.
Figure 2B:
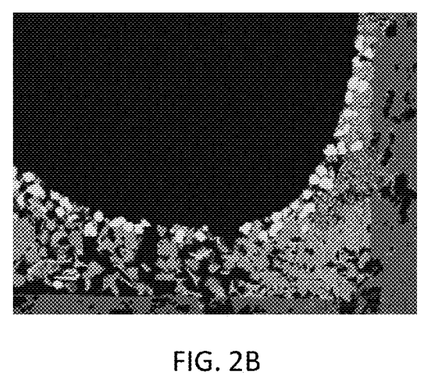
Figure 2C:
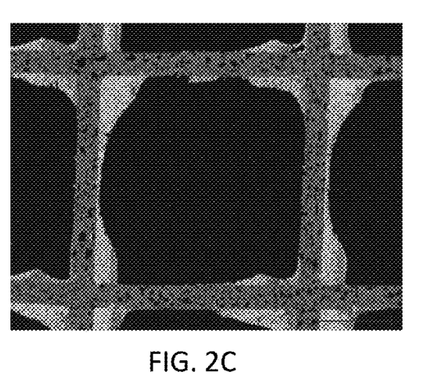
Figure 2D:
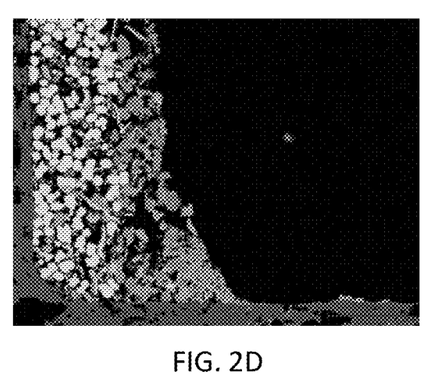

A catalytic article was prepared. A single slurry was prepared which featured Pd on ceria, Rh on Pr-doped zirconia and Dispal® high purity dispersible alumina (binder) supports. The charge differential between the two supports was 12 coulombs /$m^2$ with Pd and Rh. The solid content of the slurry was 30-40%. The slurry was used to coat on a cordierite substrate via dip coating. FIGS. 2A-D show scanning electron microscope images at different magnifications of a cross-section of the substrate. The black areas represent the passage way, while the very dark grey sections correspond to the walls of the monolith channels. The light and medium grey areas show the washcoat. Specifically, the light grey areas correspond to the ceria support and the medium grey areas correspond to the Pr-doped zirconia support. FIGS. 2B and 2D show the bottom two corners of a channel. In FIG. 2B, the Pr-doped zirconia support (medium grey) is shown as a layer directly over the substrate, with the ceria support (light grey) overlying the Pr-doped zirconia support. However, in FIG. 2D, the opposing wall shows the ceria support (light grey) as a layer over the substrate, with the Pr-doped zirconia support (medium grey) overlying the ceria support.

Example 2

A catalytic article was prepared. A single slurry was prepared which contained calcined 0.16% rhodium on a high density ceria support, 1.4% palladium on alumina support and Dispal® high purity dispersible alumina supports. The sample was generally prepared as in Example 1. ICP analysis of the supernatant liquid of the slurry after centrifugation showed no leached palladium or rhodium. This shows that all platinum group metals were fixed on the supports as designed.

Figure 3A:
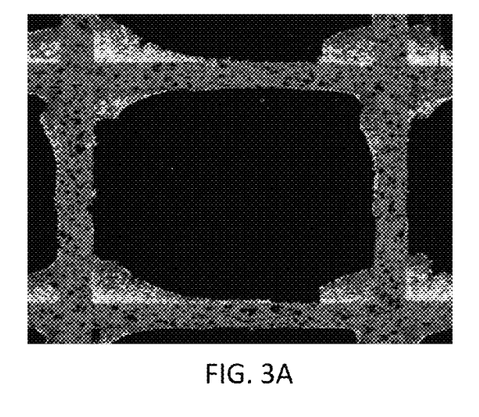
FIGS. 3A-D are transmission electron microscope images of a catalytic article in accordance with one or more embodiments of the invention.
Figure 3B:
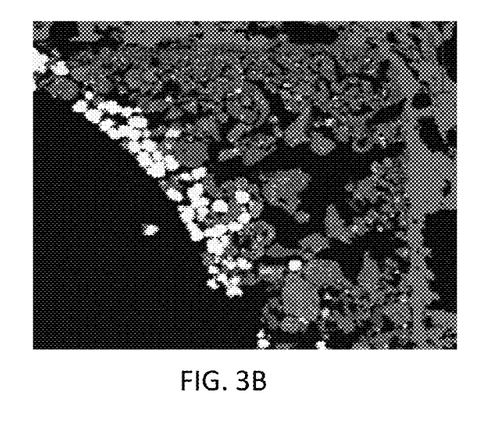
Figure 3C:
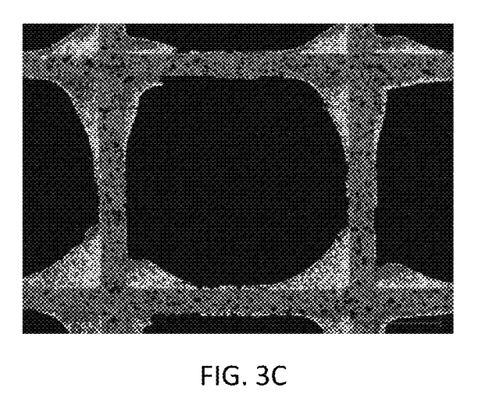
Figure 3D:
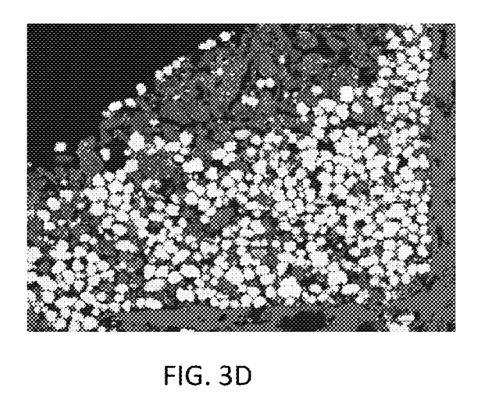

The slurry was used to coat on a cordierite substrate and was calcined at a temperature of 400-550° C. for 0.5-3 hours. FIGS. 3A-D show transmission electron microscope images at different magnifications of a cross-section of the substrate. The black areas represent the passage way, while the medium dark grey sections correspond to the walls of the monolith channels. The light and dark grey areas show the washcoat. Specifically, the light grey areas correspond to Rh/ceria and the medium grey areas correspond to the Pd/alumina. FIGS. 3B and 3D show the right two corners of a channel. In FIG. 3B, the Rh/ceria (dark grey) is shown as a layer directly over the substrate, with the Rh/ceria (light grey) overlying the Pr-doped zirconia support. However, in FIG. 3D, the opposing wall shows the Rh/ceria (light grey) as a layer over the substrate, with the Rh/ceria (dark grey) overlying the ceria support.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A catalytic article comprising an elongated substrate monolith having a plurality of longitudinally extending passages, each passage having at least a first surface and a second surface opposite the first surface, the first and second surfaces coated with at least a first coating and a second coating, wherein the first coating comprises a first catalyst composition and overlies the second coating on the first surface, the second coating comprises a second catalyst composition and overlies the first coating on the second surface, and wherein the first catalyst composition and second catalyst composition have a difference in surface charge.

2. The catalytic article of claim 1, wherein the difference in surface charge is equal to or greater than about 10 Coulombs/m$^2$.

3. The catalytic article of claim 1, wherein the first catalyst composition comprises a first platinum group metal.

4. The catalytic article of claim 3, wherein the first platinum group metal is thermally or chemically fixed to a first support material.

5. The catalytic article of claim 4, wherein the first platinum group metal comprises palladium and/or platinum.

6. The catalytic article of claim 5, wherein the palladium is present in an amount of about 0.05-10% by weight of the total catalyst, and the first support comprises zirconia.

7. The catalytic article of claim 5, wherein the second catalyst composition comprises a second platinum group metal thermally or chemically fixed to a second support material.

8. The catalytic article of claim 7, wherein the second platinum group metal is thermally or chemically fixed to the second support material, and the second platinum group metal comprises rhodium.

9. The catalytic article of claim 8, wherein the second support comprises ceria.

10. The catalytic article of claim 8, wherein the first support comprises alumina or zirconia, and the second support comprises ceria.

* * * * *